July 29, 1952 — L. G. WOODBURN — 2,604,807

WINDSHIELD WITH BUILT-IN LIGHT REFRACTING ELEMENTS

Filed June 3, 1949

Inventor
Leo G. Woodburn

Patented July 29, 1952

2,604,807

UNITED STATES PATENT OFFICE 2,604,807

WINDSHIELD WITH BUILT-IN LIGHT REFRACTING ELEMENTS

Leo G. Woodburn, Orange City, Fla.

Application June 3, 1949, Serial No. 97,013

1 Claim. (Cl. 88—1)

The present invention relates to an automobile windshield which has complemental refracting means functioning to enable the driver to conveniently pick-up and see light rays emanating from "stop" and "go" traffic signalling lights of the so-called overhead type employed principally at intersections.

It is a matter of common knowledge that when a driver in an automobile closely approaches an overhead traffic signalling light, unless he is riding in an automobile with the top down, he has difficulty seeing the traffic light. In fact, all drivers of automobiles are familiar with head-twisting, neck-straining and eye-angling difficulties encountered because of the often awkward relationship of the car to intersection-centered overhead traffic signalling lights. What is more, numerous efforts and contrivances have been put forth to aid and assist drivers to obtain a view of the changing signalling lights without encountering strain-producing difficulties. That is to say, it has come to my attention that many and varied types of remote signal viewing devices have been proposed, some for attachment to the radiator cap or other part of the hood in front of the usual windshield, and others for direct association with the windshield itself. Reference may be made, for example, to B. W. David, 1,637,309 of July 26, 1927.

The prior art devices referred to are objectionable for one reason or another. Consequently, the need for a windshield with an appropriate signal light pick-up and viewing means still exists. In such circumstances, I have devised what I believe to be a simple and practical prismatic-like device which is destined, it is submitted, to be endorsed and ultimately brought into actual use. I achieve the wanted ends through the medium of an unusually simple and inextensive assemblage of concave depressions orderly and systematically grouped to provide a novel refracting zone or media for light rays, the latter forming a complemental part of the windshield itself.

Other objects and advantages will become more readily apparent from the following description and the accompanying sheet of illustrative drawings.

In the drawings, wherein like numerals are employed to designate like details throughout the several views.

Figure 1:
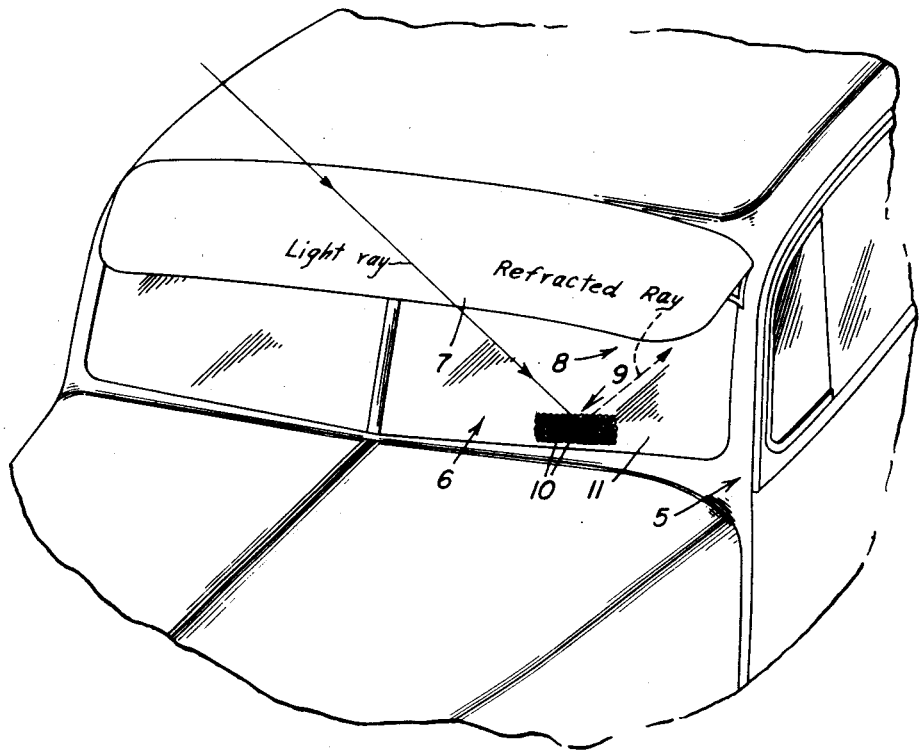
Figure 1 is a fragmentary perspective view of an automobile having a windshield equipped with my improved light ray pick-up, viewing and refracting zone.
Figure 2:
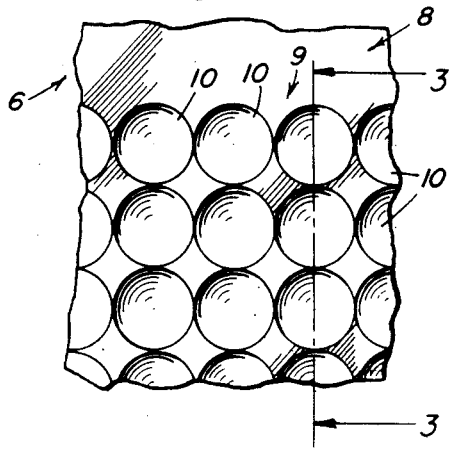
Figure 2 is an enlarged fragmentary front elevation of my improved windshield.
Figure 3:
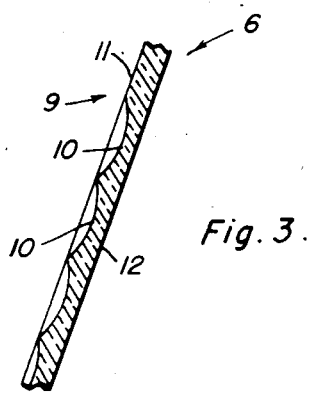
Figure 3 is a section on the line 3—3 of Figure 2 looking in the direction of the arrows.

Referring now to the drawings by distinguishing reference numerals and lead lines, the automobile is denoted by the numeral 5, the windshield by the numeral 6, and the visor by the numeral 7. Visors are optional accessories, but when they are used, they all the more interfere with the driver's attempting to obtain and maintain a steady bead on an overhead signalling light. The principal vision area or region of the windshield, the part directly in front of the driver, is denoted by the numeral 8 and this area must be left, obviously, unobstructed.

The aforementioned ray refracting and bending zone is denoted by the numeral 9. This zone is made up of systematically clustered, dimple-like depressions. The depressions are therefore concave in form and preferably circular in outline. It will be noticed that the over-all zone is approximately rectangular, that it is an integral part of the windshield. Said zone is situated in the lower left-hand corner portion of the windshield glass as shown in Fig. 1. More explicitly, the depressions are formed in the outer or forward surface 11 of the windshield, while the portion of the windshield immediately in line with these depressions is flat, at 12, as usual. The depressions are systematically arranged in horizontal and vertical rows and therefore the rectangular zone is clearly discernible and constitutes an isolated, optionally usable safety feature which is below the normal line of vision but is nevertheless properly situated to come into play whenever the automobile, equipped with the improved windshield, comes to stop within the vicinity of an overhead traffic light.

The over-all zone is prismatic-like in effect. As a matter of fact, the upper half portions of the circular depressions may be best described as prismatic elements. They function under the arrangement shown, to singly and collectively pick up the downwardly directed light rays or beam from an overhead traffic light, and the rays passing through the prismatic light zone are refracted so that they may be seen, at approximately normal eye level by the observer; that is, the driver of the automobile.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

As a new manufacture, an automobile windshield comprising a conventional pane of glass having an isolated definitely defined prismatic-like light refracting zone which is adapted to direct light rays emanating from an overhead traffic light across the line of vision of the observer of said traffic light, said zone being relatively small and inconspicuous and confined in one lower corner portion of the windshield well below the line of vision and being made up of a multiplicity of vertical and horizontal rows of part-spherical depressions, the latter being clustered together and formed in the forward surface of said pane of glass and the upper half-portions of said depressions providing what are, in effect, prismatic elements.

LEO G. WOODBURN.

REFERENCES CITED

The following references are of record in the file of this patent:

UNITED STATES PATENTS

| Number | Name | Date |
|---|---|---|
| 1,604,881 | Cape | Oct. 26, 1926 |
| 1,605,964 | Mapelsden | Nov. 9, 1926 |
| 1,637,309 | David | July 26, 1927 |
| 1,678,479 | Patten et al. | July 24, 1928 |
| 2,174,003 | Ives | Sept. 26, 1939 |

FOREIGN PATENTS

| Number | Country | Date |
|---|---|---|
| 520,195 | Germany | Mar. 9, 1931 |